United States Patent

Yeoman et al.

[11] Patent Number: 5,948,211
[45] Date of Patent: *Sep. 7, 1999

[54] DISTILLATION COLUMN DOWNCOMER HAVING LIQUID PERMEABLE WALL

[75] Inventors: Neil Yeoman, Merrick, N.Y.; Ronald Pinaire, Wichita, Kans.; Michael A. Ulowetz, Vincennes, Ind.

[73] Assignee: Koch-Glitsch, Inc., Wichita, Kans.

[ * ] Notice: This patent is subject to a terminal disclaimer.

[21] Appl. No.: 08/545,559

[22] Filed: Oct. 19, 1995

Related U.S. Application Data

[60] Continuation-in-part of application No. 08/135,921, Oct. 13, 1993, Pat. No. 5,496,446, which is a division of application No. 07/962,254, Oct. 16, 1992, Pat. No. 5,454,913, which is a continuation-in-part of application No. 07/775,010, Oct. 11, 1991, Pat. No. 5,291,989, which is a continuation of application No. 07/475,971, Feb. 6, 1990, Pat. No. 5,108,550.

[51] Int. Cl.$^6$ .................................................. B01D 3/32
[52] U.S. Cl. .......................... 202/158; 261/103; 261/106; 261/114.1; 261/114.4; 203/99
[58] Field of Search .................................. 202/158, 267.2; 261/99–100, 114.2, 114.1, 114.3, 144.4, 101, 103, 106; 203/29, 99, DIG. 6, 100; 159/DIG. 28

[56] References Cited

U.S. PATENT DOCUMENTS

| | | |
|---|---|---|
| 2,676,875 | 4/1954 | Barr . |
| 3,541,000 | 11/1970 | Hanson et al. . |
| 3,629,478 | 12/1971 | Haunschild . |
| 3,634,535 | 1/1972 | Haunschild . |
| 3,882,167 | 5/1975 | Lohmar et al. . |
| 4,028,191 | 6/1977 | Scott ........................................ 202/158 |
| 4,105,723 | 8/1978 | Mix ........................................ 261/110 |
| 4,126,539 | 11/1978 | Derr, Jr. et al. . |
| 4,129,626 | 12/1978 | Mellbom ............................... 261/114.1 |
| 4,213,847 | 7/1980 | Chen et al. . |
| 4,215,011 | 7/1980 | Smith, Jr. . |
| 4,302,356 | 11/1981 | Smith, Jr. . |
| 4,307,254 | 12/1981 | Smith, Jr. . |
| 4,405,449 | 9/1983 | Trager ................................... 202/158 |
| 4,439,350 | 3/1984 | Jones, Jr. . |
| 4,443,559 | 4/1984 | Smith, Jr. . |
| 4,471,154 | 9/1984 | Franklin . |
| 4,540,831 | 9/1985 | Briggs . |
| 4,579,647 | 4/1986 | Smith . |
| 4,582,569 | 4/1986 | Jenkins ................................... 202/158 |
| 4,620,952 | 11/1986 | Hsieh . |
| 4,623,454 | 11/1986 | Tauscher et al. . |
| 4,722,780 | 2/1988 | Franck et al. . |
| 4,731,229 | 3/1988 | Sperandio . |
| 4,836,989 | 6/1989 | Aly et al. . |
| 4,839,108 | 6/1989 | Silvey . |
| 4,847,431 | 7/1989 | Nocca et al. . |
| 4,872,955 | 10/1989 | Parker et al. .......................... 202/158 |
| 5,026,459 | 6/1991 | Quang et al. . |

(List continued on next page.)

FOREIGN PATENT DOCUMENTS

| | | |
|---|---|---|
| 402019 | 12/1990 | European Pat. Off. . |
| 0470655 | 2/1992 | European Pat. Off. . |
| 2437239 | 4/1980 | France . |
| 872938 | 4/1953 | Germany . |
| 2034597 | 6/1980 | United Kingdom . |

OTHER PUBLICATIONS

*Patent Abstracts of Japan*, vol. 8, No. 279 (C–257)[1716], Dec. 20th 1984; & JP–A–59 147 632 (Mitsui Zousen Engineering) Aug. 24, 1984.

*Primary Examiner*—Virginia Manoharan
*Attorney, Agent, or Firm*—Shook, Hardy & Bacon L.L.P.

[57] ABSTRACT

A downcomer having a screened or otherwise liquid permeable wall is provided for use in a mass transfer or distillation column. The liquid permeable wall provides another avenue for liquid to be removed from the downcomer to increase the liquid handling capacity of the downcomer. When wetted, the liquid permeable wall provides a barrier against vapor entry into the downcomer through the wall.

18 Claims, 4 Drawing Sheets

U.S. PATENT DOCUMENTS

| | | |
|---|---|---|
| 5,073,236 | 12/1991 | Gelbein et al. . |
| 5,091,060 | 2/1992 | Walker et al. .......................... 202/158 |
| 5,108,550 | 4/1992 | Pinaire et al. . |
| 5,141,861 | 8/1992 | Dale . |
| 5,236,663 | 8/1993 | Alagy et al. . |
| 5,266,546 | 11/1993 | Hearn . |
| 5,277,847 | 1/1994 | Gentry et al. ........................ 261/114.1 |
| 5,368,592 | 11/1994 | Yang et al. . |
| 5,389,343 | 2/1995 | Gentry . |
| 5,407,605 | 4/1995 | Resetarits et al. ...................... 261/113 |
| 5,478,507 | 12/1995 | Bros ..................................... 261/114.1 |
| 5,480,595 | 1/1996 | Yeoman et al. ...................... 261/114.1 |
| 5,496,446 | 3/1996 | Yeoman et al. .................... 203/DIG. 6 |

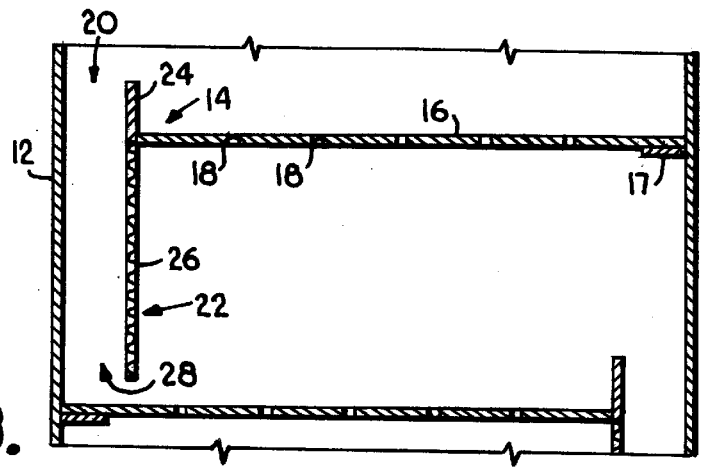
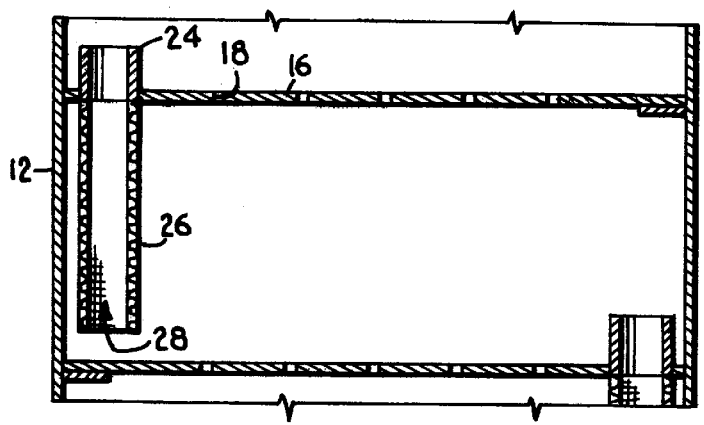
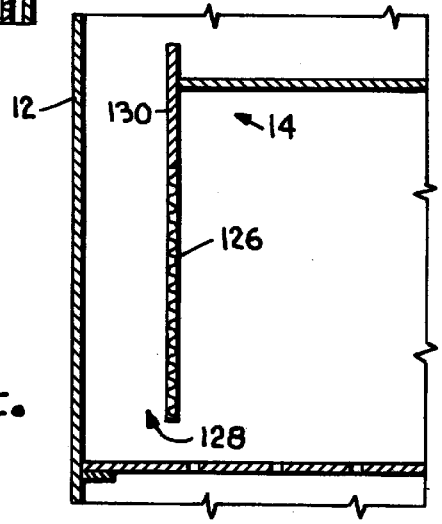

Fig.5.
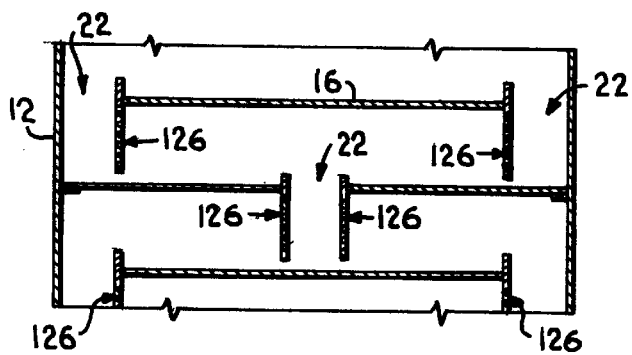
Fig.6.
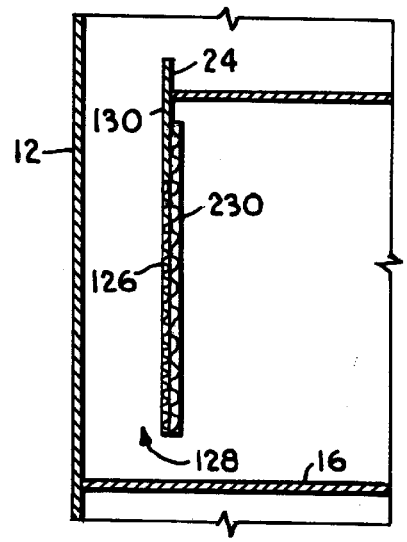
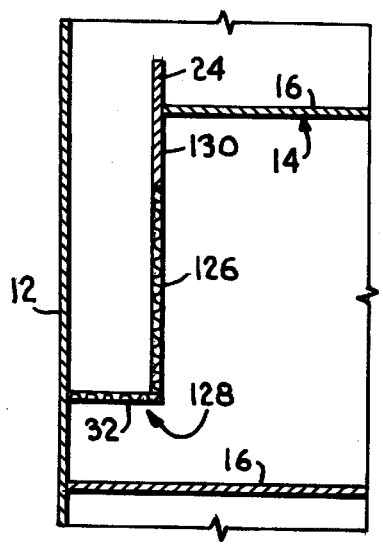
Fig.7.
Fig.9.
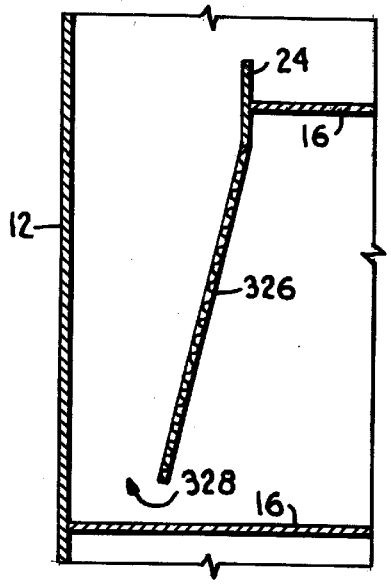

DISTILLATION COLUMN DOWNCOMER HAVING LIQUID PERMEABLE WALL

This is a continuation-in-part of U.S. application Ser. No. 08/135,921, filed Oct. 13, 1993, now U.S. Pat. No. 5,496,446, which is a division of U.S. application Ser. No. 07/962,254, filed Oct. 16, 1992, now U.S. Pat. No. 5,454,913, which is a continuation-in-part of U.S. application Ser. No. 07/775,010, filed Oct. 11, 1991, now U.S. Pat. No. 5,291,989, which is a continuation of U.S. application Ser. No. 07/475,971, filed Feb. 6, 1990, now U.S. Pat. No. 5,108,550.

BACKGROUND OF THE INVENTION

This invention relates in general to a mass transfer or distillation column and, more particularly, to a downcomer within the column for feeding liquid from one tray to an underlying tray.

Conventional downcomers are used in mass transfer or distillation columns to provide a pathway for liquid to descend from one tray to an underlying tray. The trays used in conjunction with the downcomers are horizontally disposed plates that are perforated so that they are permeable to ascending vapor. The vapor passes upwardly through the perforations in the trays and interacts with liquid flowing across the top surface of the trays. Sieve trays and valve trays are examples of commonly employed trays used in conjunction with downcomers.

In single pass arrangements, the downcomers are positioned on opposite ends of adjacent trays so that the liquid flows completely across one tray before it enters the associated downcomer and is fed onto the underlying tray. The liquid then flows in the opposite direction across the underlying tray and enters the associated downcomer for passage to the successive underlying trays in a back and forth manner. In multiple pass arrangements, more than one downcomer is placed at preselected positions on at least every other tray and the liquid is divided into separate streams for passage through the respective downcomers.

The downcomers used in mass transfer columns typically have a plurality of generally vertical, but sometimes sloped, walls which are joined together to form an open-ended enclosure. The downcomer walls are fabricated from solid sheet-like material such as metal and one or more of the walls may be formed by the column shell. The downcomer walls thus channel the liquid entering the downcomer downwardly for discharge through the bottom of the downcomer onto the underlying tray. At least one of the downcomer walls is joined to the edge of the associated tray and a liquid accumulation weir is usually formed by an upward extension of the downcomer wall.

The bottom or downstream end of conventional downcomers is at least partially open to form a liquid discharge outlet which is spaced a preselected distance above the underlying tray. Typically, the downcomer outlet is positioned below the level of the liquid that accumulates on the underlying tray to create a seal against vapor entering the downcomer outlet.

Because the downcomer outlet must typically be located below the liquid level on the underlying tray, the area available to accommodate the discharge of liquid from the downcomer is necessarily restricted. In most instances, all of the liquid which is discharged from the downcomer outlet must pass through the vertical area bounded at the top by the bottom edge of the forward downcomer wall, at the bottom by the tray upper surface and at the sides by the column shell. If the vertical area is too small in relation to the volumetric flow rate of liquid entering the downcomer, liquid will back up in the downcomer and flooding of the downcomer may result. This restricted outlet flow area can thus undesirably limit the liquid handling capacity of the downcomer.

Increasing the restricted outlet flow area by shortening the downcomer is a generally unsatisfactory approach to increasing liquid handling capacity because the shortened downcomer provides less opportunity for entrained vapor to disengage from the liquid prior to being discharged from the downcomer. In addition, if the downcomer outlet is raised above the liquid level on the underlying tray, the vapor would be permitted to enter the downcomer outlet and disrupt the liquid flow dynamics. Although the vapor seal can be maintained by increasing the height of the weir and thus raising the liquid level on the tray, less open space remains above the liquid froth level on the tray for disengagement of the entrained liquid from the ascending vapor. As a result, the operational efficiency of the downcomer and tray structure is reduced as the entrained liquid is recycled from one tray to an overlying tray.

Another approach to increasing the liquid handling capacity of downcomers involves the use of a sump in the tray area below the discharge outlet of the downcomer. The sump increases the distance of separation between the tray and the downcomer outlet, thereby increasing the area available for liquid flow. While the tray sump can reduce the pressure drop and increase the liquid handling capacity of the downcomer, it prevents the use of raised seal pans or tray decks which are designed to increase the vapor handling capacity of the tray. Another disadvantage to the use of these tray sumps is the added complexities in design and installation of these internals.

A need has thus arisen for a downcomer which has an increased liquid handling capacity but which does not suffer the disadvantages associated with conventional downcomers.

SUMMARY OF THE INVENTION

It is an object of this invention to provide an improved downcomer structure having an increased liquid handling capacity in comparison to conventional solid wall downcomers.

It is also an object of this invention to provide a mass transfer column with a downcomer which has a liquid permeable wall to provide an additional route for liquid to exit the downcomer, thereby increasing the liquid handling capacity of the downcomer.

It is another object of this invention to provide a mass transfer column with a downcomer as described which increases the surface area available for liquid and vapor contact to facilitate the mass transfer between liquid and vapor phases.

It is still another object of this invention to provide a mass transfer column with a downcomer as described so that the desired liquid handling capacity can be achieved while maintaining the necessary vertical spacing between associated distillation trays to allow entrained liquid to disengage from ascending vapor, thereby reducing recycling of the liquid to overlying trays.

It is yet another object of this invention to provide a mass transfer column with a downcomer having an increased liquid handling capacity which does not result in a high pressure drop so that liquid is less susceptible to backing up in the downcomer with resulting flooding of the column.

It is a further object of this invention to provide a mass transfer column with a high capacity downcomer which has a sufficient vertical height to provide the opportunity for vapor to disengage from the liquid flowing through the downcomer before it is discharged onto the underlying tray.

To accomplish these and other related objects, in one aspect, the invention is directed to a mass transfer column comprising an external shell and a plurality of tray and downcomer structures within said shell. At least one of the tray and downcomer structures comprises:

a tray having a plurality of openings for permitting the upward passage of vapor; and a downcomer associated with and extending below the tray to remove liquid from said tray and feed it to a lower tray and downcomer structure, said downcomer having one wall extending downwardly from said tray toward said lower tray and downcomer structure, at least a portion of said one wall comprising a liquid permeable material being constructed to present a substantially vapor-impervious barrier when wetted with a liquid during operation of the mass transfer column.

In another aspect, the invention is directed to a method or process for operating a column containing a plurality of such vertically spaced apart tray and downcomer structures. The process includes the steps of:

(a) supplying a liquid stream to one of said tray and downcomer structures;

(b) flowing said liquid stream across the tray in said tray and downcomer structure;

(c) directing said liquid stream from said tray into the upstream inlet of the downcomer in said tray and downcomer structure;

(d) passing said liquid stream downwardly through said downcomer under the influence of gravity, said liquid stream in the downcomer being in contact with said liquid permeable wall to cause wetting thereof and to resist passage of vapor therethrough;

(e) discharging a portion of said liquid stream from the downcomer through the bottom discharge outlet and onto the tray of an underlying tray and downcomer structure;

(f) removing another portion of the liquid stream from the downcomer by permeating the liquid stream through the liquid permeable wall;

(g) repeating steps (b)–(f) on successive lower ones of said tray and downcomer structures; and (h) directing a vapor stream upwardly through said trays for contact with said liquid stream.

BRIEF DESCRIPTION OF THE DRAWINGS

In the accompanying drawings which form part of the specification and are to be read in conjunction therewith and in which like reference numerals are used to indicate like parts in the various views:

FIG. 2 is a fragmentary side elevation view of the tray and downcomer structure shown in FIG. 1 and taken in cross section along line 2—2 of FIG. 1;

FIG. 3 is a fragmentary side elevation view taken in vertical cross section of another embodiment of the tray and downcomer structure;

FIG. 4 is a fragmentary side elevation view taken in vertical cross section of a further embodiment of the tray and downcomer structure shown in FIG. 2 but with a modified downcomer wall;

FIG. 5 is a fragmentary side elevation view, shown somewhat schematically, of a two-pass embodiment of the tray and downcomer structure of the present invention;

FIG. 6 is a fragmentary side elevation view taken in vertical cross section of a tray and downcomer structure similar to that shown in FIG. 4 but utilizing a double layer of liquid permeable material to form a wall of the downcomer;

FIG. 7 is a fragmentary side elevation view taken in vertical cross section of a still further embodiment of a tray and downcomer structure of the present invention in which the outlet of the downcomer is closed by a liquid permeable screen;

FIG. 9 is a fragmentary side elevation view taken in vertical cross section of a further embodiment of the tray and downcomer structure shown in FIG. 2 but showing a sloped downcomer wall.

DESCRIPTION OF THE PREFERRED EMBODIMENTS

Figure 1:
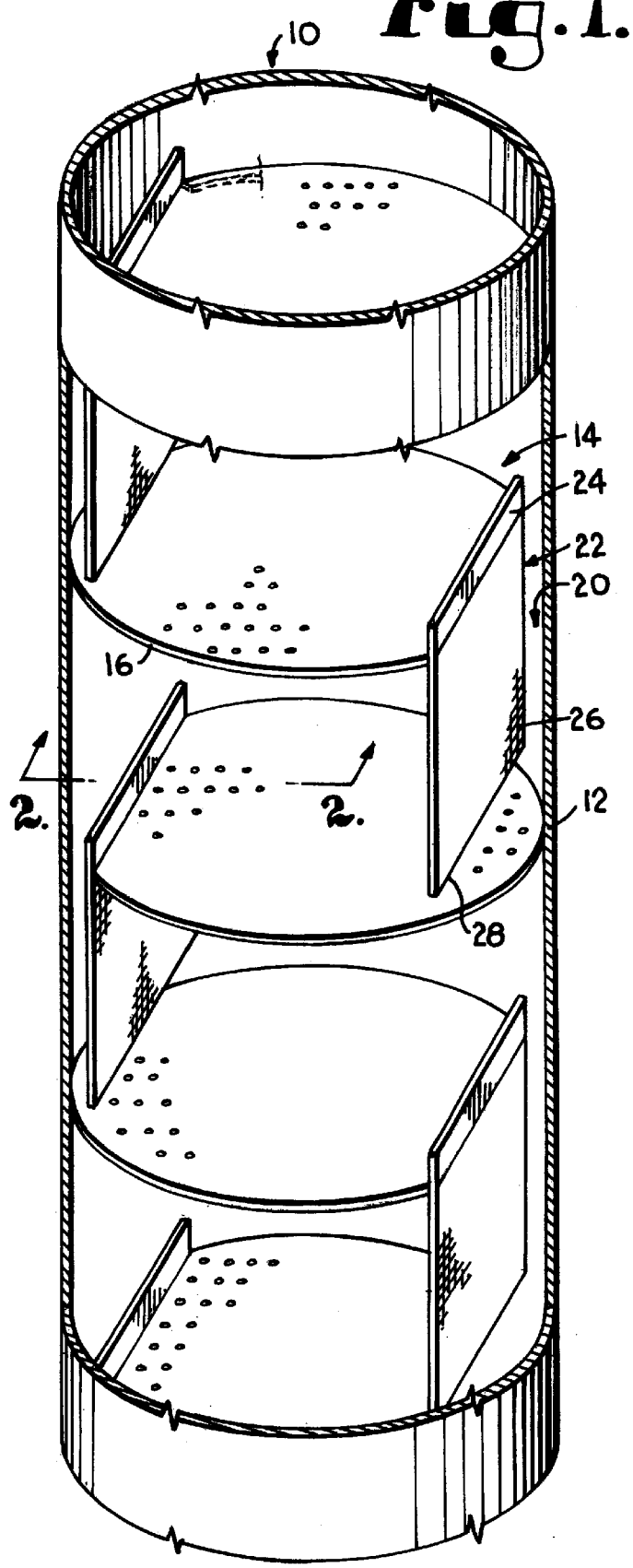
FIG. 1 is a perspective view of a column shown with portions broken away to illustrate the tray and downcomer structures constructed in accordance with the present invention.

Turning now to the drawings in greater detail, and initially to FIG. 1, a mass transfer or distillation column is designated generally by the numeral 10. Column 10 includes an external shell 12 which is of cylindrical configuration although other configurations including polygonal could be utilized if desired. The shell 12 has a vertical longitudinal axis and a plurality of tray and downcomer structures 14 of the present invention are supported on the inside of the shell 12 in vertically spaced apart relationship. Only that portion of the column 10 relating to the present invention is illustrated and it is to be understood that the column will normally include other components such as liquid and vapor feed and removal lines and may include other internals as well. These other features of the column 10 are well known to those of ordinary skill in the art and need not be set forth herein.

Turning additionally to FIG. 2, each tray and downcomer structure 14 of the present invention includes a horizontally extending mass transfer device in the form of a distillation tray 16 which is supported by a bracket 17 attached to the interior of the column shell 12. Each distillation tray 16 is of a typical sieve-type plate construction which is employed to provide for vapor and liquid interaction as liquid flows over the tray surface. A plurality of small apertures 18 are formed in the trays to provide for ascending vapor passage and, thus, vapor-liquid phase interaction on and above the upper surface of the tray. Other types of trays such as valve trays, bubble cap trays, and jet tab trays may be utilized in place of or in conjunction with trays 16.

Each tray 16 is configured to the internal size and shape of column shell 12 and adjacent trays are vertically spaced at the desired positions within column 10. Large openings 20 are provided at opposite ends of adjacent trays 16 to accommodate downcomers 22 which extend through the trays 16 and are held in place by suitable fittings (not shown). Each downcomer 22 extends vertically downward from one tray 16 and terminates above a lower tray, typically the immediately underlying tray, to provide a liquid passage between the trays.

An overflow weir 24 extends along the edge of each tray 16 adjacent the large opening 20 to cause liquid to accumulate on the tray 16 to a preselected depth before it spills over the weir 24 and enters the upstream end of the associated downcomer 22. It is to be understood that the weirs 24 can be omitted from some or all of the trays 16 if desired.

Each downcomer 22 has one wall 26 which is typically coplanar with the overflow weir 24, if present, and extends between two opposite points on the wall of column shell 12 to present a liquid confining structure. Downcomer wall 26 is formed from a planar section of material which is liquid permeable and is also capable of retaining enough liquid to prevent vapor from breaking through the downcomer wall during normal operation of the column 10. The material chosen for downcomer wall 26 should exhibit a sufficiently high capillarity so that when it is wetted with liquid it will resist vapor breakthrough despite the pressure differential that will normally be present across the surface of the downcomer material when vapor and liquid streams are flowing in the column 10. Various types of mesh or screen-like materials which are compatible with the conditions within the column 10 can be used for downcomer wall 26. If a wire gauze or metal screen is used, it should be tightly woven in order to provide the capillarity required to prevent vapor breakthrough. Other materials such as plastic gauze, glass fiber cloth, and ceramics, may also be utilized if they are constructed in a manner to provide liquid permeability and the necessary capillarity.

By utilizing a downcomer of screen-like material which is liquid permeable, the liquid handling or throughput capacity of the downcomer is increased over what has heretofore been possible with solid wall downcomer constructions. Instead of exiting the downcomer 22 only through the open bottom end or outlet 28, liquid that has entered the downcomer 22 through the upstream end of the downcomer can also escape by flowing through the liquid permeable wall 26. This additional route for liquid to escape the downcomer 22 allows more liquid to flow through the downcomer without causing liquid to completely backup in the downcomer with resulting flooding of the column.

Furthermore, some mass transfer will occur on the wall 26 of the downcomer as down-flowing liquid interacts with ascending vapor. This improves the overall efficiency of the column and achieves mass transfer in an area where it would not be possible if the downcomer was of a solid wall construction. In order to prevent vapor from flowing upwardly through the downcomer, a suitable vapor seal should be provided at the bottom or outlet end 28 thereof. This can be accomplished by extending the outlet end 28 of the downcomer below the liquid level on the underlying tray.

As the liquid phase is descending through the downcomers 22, the vapor phase which is typically generated elsewhere in the column 10 by evaporation of part of the liquid phase (but could be from another source) ascends through the small apertures 18 in the trays 16 and intermixes with the liquid phase which passes out of the porous downcomers through downcomer wall 26 and outlet 28. The primary mass transfer between the liquid and vapor phases occurs on the trays but some also occurs on the surface of downcomer wall 26. After the vapor phase progresses to the top of the column 10 it may be condensed and a portion of the condensate returned to the column as a reflux. These products may be further processed within the column and/or removed from the column in a manner well known to those skilled in the art.

Thus, in a process in accordance with the present invention, liquid flows downwardly through downcomers 22 and flows back and forth across successively lower trays 16.

At least a portion of the liquid entering the upstream end of each downcomer 22 flows downwardly along the downcomer wall 26 to cause wetting thereof. The wetted wall 26 thus acts as a barrier to prevent vapor from passing through the wall 26 and entering the downcomer 22. Most of the liquid which descends through the downcomer 22 is discharged through the open bottom or outlet end 28 of the downcomer onto the underlying tray 16. However, at least a portion of the liquid descending through the downcomer 22 weeps or passes through the downcomer wall and likewise is fed onto the underlying tray. The amount of liquid that flows through the permeable downcomer wall 26 is dependent upon variables such as liquid flow rate, the pressure drop across the wall 26, and the pressure drop through the vertical open area between the tray 16 and the bottom of downcomer wall 26. As liquid flow rates increase, more liquid will back up in the downcomer and the increased liquid head will result in more liquid will being forced through the downcomer wall 26. Because liquid is forced through the downcomer wall 26 at higher flow rates, the level to which the liquid backs up is lower than would otherwise be experienced if liquid were unable to exit through the downcomer wall 26. The risk of flooding of the column 10 is thus reduced by use of the liquid permeable downcomer wall 26. In addition to increasing the liquid flow capacity of the downcomer 22, the liquid permeable wall 26 facilitates vapor and liquid interaction by providing increased surface area for contact between the vapor and liquid phases.

It can be appreciated that various modifications can be made to the tray and downcomer structure 14 and still remain within the scope of the present invention. For example, the downcomers can be formed entirely separately from the column shell 12 with the shell forming no part of the walls of the downcomer. Thus, as shown in FIG. 3, downcomers 30 of various desired configurations such as cylindrical, polygonal, and segmental in cross section can be formed entirely by the permeable downcomer wall 26. If desired, portions of the wall 26 can be liquid impermeable or of reduced liquid permeability to cause preferential directional discharge of the liquid through the wall 26.

As previously mentioned, the downcomer wall 26 need not be made entirely of liquid permeable material. Instead, portions of the downcomer wall 26 can be formed of liquid impermeable material such as solid sheets of metal or other suitable material. One such modification is illustrated in FIG. 4 wherein a downcomer wall 126 has a lower portion 128 comprising liquid permeable material as previously described and an upper portion 130 formed of solid sheet material.

Another variation in the downcomer wall construction is shown in FIG. 6 wherein a second sheet 230 of liquid permeable material is joined to the lower portion 128 and optionally the upper portion 130 of the downcomer wall 126 illustrated in FIG. 4. The second sheet 230 can be made of the same or different material as is used for the lower wall portion 128. The second sheet 230 can have a higher or lower liquid permeability than the lower wall portion 128 to provide the desired liquid flow capability while serving as a barrier to vapor flow.

As shown in FIG. 7, the bottom outlet 28 of downcomer 22 can also be partially or completely closed by a sheet 32 of liquid permeable material such as is used for downcomer wall portion 128. The use of the liquid permeable sheet 32 to close the outlet 28 increases the pressure drop across the outlet 28 and forces more liquid to flow through the downcomer wall portion 128.

Figure 8:
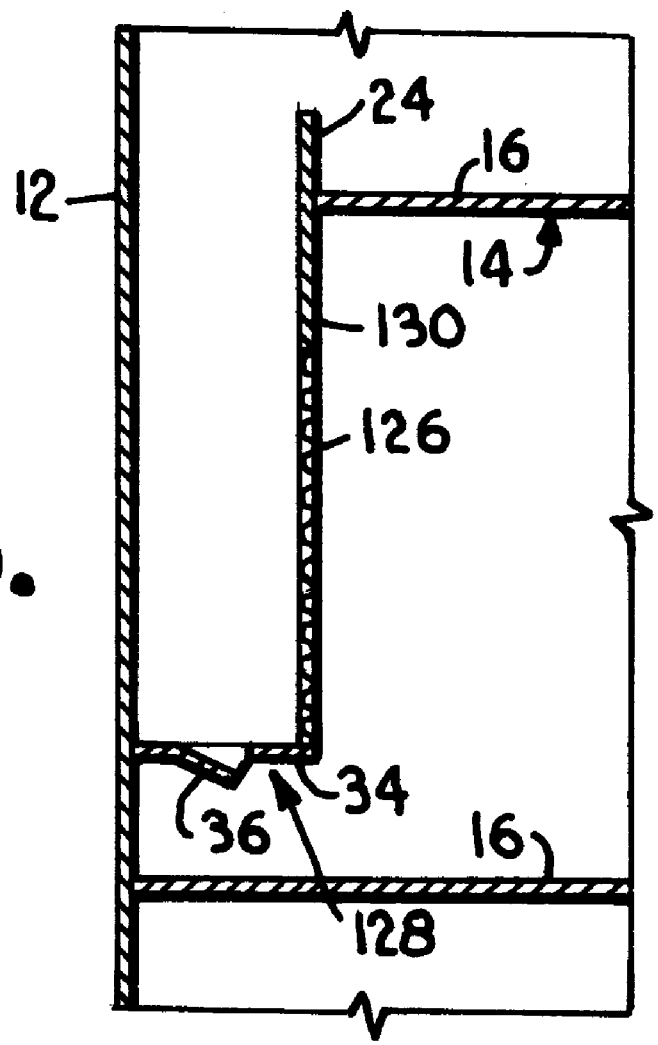
FIG. 8 is a fragmentary side elevation view taken in vertical cross section of a yet further embodiment of a tray and downcomer structure of the present invention in which directional louvres are formed in the otherwise closed outlet of the downcomer.

The bottom downcomer outlet 28 can also be closed by one or more plates of solid material which form or contain openings to permit passage of liquid. As illustrated in FIG. 8, a plate 34 of solid material containing directional flow louvres 36 is positioned at the downcomer outlet 28. The louvres 36 extend below the plate 34 and have discharge outlets which lie in a plane at an angle to the horizontal to cause liquid to be discharged therefrom in the direction of flow across the tray 16 being fed by the downcomer. Further details of the louvres 36 and other means for discharging liquid from outlet 28 are set forth in commonly assigned prior U.S. application Ser. No. 08/234,188, now U.S. Pat. No. 5,480,595, which is incorporated herein by reference in its entirety.

The liquid permeable wall of the downcomer also need not lie in a vertical plane. For example, as shown in FIG. 9, a sloped wall 326 can be used to decrease the area of the bottom discharge outlet 328 and thereby increase the active area of tray 16. The liquid permeable of the sloped downcomer 326 is particularly advantageous in this embodiment because the reduced area of the bottom discharge outlet 328 increases the pressure drop across the outlet and reduces the amount of liquid that can be discharged through outlet 328.

While the invention has been described with respect to a single pass arrangement in which a single downcomer is placed at an opposite end on each successive tray, it is to be understood that the invention has applicability to multiple pass arrangements. For example, in a two pass arrangement as shown somewhat schematically in FIG. 5, two downcomers 22 can be placed at opposite ends on alternating trays 16 while one centrally positioned downcomer 22 is placed on each of the remaining trays which are adjacent to and positioned between the trays containing downcomers at opposite ends. The centrally positioned downcomer 22 would thus utilize two liquid permeable walls 126 rather than one. It will of course be appreciated that multiple liquid permeable walls can be used for any of the various downcomer embodiments.

From the foregoing, it will be seen that this invention is one well adapted to attain all the ends and objectives hereinabove set forth, as well as other advantages which are likely to become apparent upon utilization of the invention in commercial applications.

It will be understood that certain features and subcombinations of the invention disclosed are of utility and may be employed without reference to other features and subcombinations. This is contemplated by and is within the scope of the claims.

Since many possible embodiments may be made of the invention without departing from the scope thereof, it is understood that all matter herein set forth or shown in the accompanying drawings is to be interpreted as illustrative and not in a limiting sense.

Having thus described the invention, what is claimed is:

1. In a mass transfer column having an external column shell and a plurality of trays in vertically spaced relationship, said trays having at least one opening for accommodating the passage of liquid to the next lower tray, the improvement comprising:
   a liquid confining structure of mesh or screen material extending from said opening in a first tray to a point above a second lower tray, said mesh or screen material being liquid permeable to permit liquid to exit the liquid confining structure by passing through the mesh or screen material and having a sufficiently high capillarity to present a substantially vapor-impervious barrier when wetted with a liquid during operation of the mass transfer column to impede passage of vapor through the mesh or screen material.

2. The mass transfer column as set forth in claim 1, wherein said liquid confining structure comprises a cylinder.

3. The mass transfer column as set forth in claim 1, wherein said liquid confining structure terminates at a point above a level at which liquid accumulates on said second lower tray.

4. The mass transfer column as set forth in claim 1, wherein said liquid confining structure comprises a planar wall which is juxtaposed in relation to the external column shell wall to present a downcomer for liquid flowing from said first tray to said second lower tray.

5. The mass transfer column as set forth in claim 1, wherein said liquid confining structure terminates at a point below a level at which liquid accumulates on said second lower tray.

6. The mass transfer column as set forth in claim 1, wherein said liquid confining structure is polygonal or segmental in horizontal cross section.

7. A mass transfer column comprising an external shell and a plurality of tray and downcomer structures in vertically spaced relationship within said shell, at least one of said tray and downcomer structures comprising:
   a tray having a plurality of openings for permitting the upward passage of vapor; and
   a downcomer associated with and extending below the tray to remove liquid from said tray and feed it to a lower tray and downcomer structure, said downcomer having one wall extending downwardly from said tray toward said lower tray and downcomer structure, at least a portion of said one wall comprising a first sheet of liquid permeable material being constructed to permit liquid to exit the downcomer by passing through said first sheet of liquid permeable material and to present a substantially vapor-impervious barrier when wetted with a liquid during operation of the mass transfer column to impede passage of vapor through the first sheet of liquid permeable material.

8. The mass transfer column as set forth in claim 7, wherein a bottom discharge outlet of said downcomer terminates at a point above a level of accumulated liquid on said lower tray.

9. The mass transfer column as set forth in claim 8, including a sheet of liquid permeable material closing said bottom discharge outlet of said downcomer.

10. The mass transfer column as set forth in claim 8, including a plate closing said bottom discharge outlet of said downcomer and presenting openings for passage of liquid.

11. The mass transfer column as set forth in claim 10, wherein said plate includes louvres associated with said openings to impart a horizontal directional flow to liquid passing through said louvres.

12. The mass transfer column as set forth in claim 7, wherein said one wall of the downcomer is formed of a sheet of mesh or screen material.

13. The mass transfer column as set forth in claim 7, wherein at least a portion of said one wall of the downcomer is sloped at an angle to the vertical.

14. The mass transfer column as set forth in claim 7, wherein said downcomer includes other walls joined with said one wall to form liquid confining structure.

15. The mass transfer column as set forth in claim 14, wherein said column shell forms at least a portion of said other walls of the downcomer.

16. The mass transfer column as set forth in claim 14, wherein said other walls of the downcomer are spaced from the column shell.

17. A mass transfer column comprising an external shell and a plurality of tray and downcorner structures in vertically spaced relationship within said shell, at least one of said tray and downcomer structures comprising:

a tray having a plurality of openings for permitting the upward passage of vapor; and a downcomer associated with and extending below the tray to remove liquid from said tray and feed it to a lower tray and downcomer structure, said downcomer having one wall extending downwardly from said tray toward said lower tray and downcomer structure, at least a portion of said one wall comprising a first sheet of liquid permeable material being constructed to present a substantially vapor-impervious barrier when wetted with a liquid during operation of the mass transfer column, wherein said one wall of the downcomer includes a second sheet of liquid permeable material having a different liquid permeability than said first sheet.

18. A mass transfer column comprising an external shell and a plurality of tray and downcomer structures in vertically spaced relationship within said shell, at least one of said tray and downcomer structures comprising:

a tray having a plurality of openings for permitting the upward passage of vapor; and a downcomer associated with and extending below the tray to remove liquid from said tray and feed it to a lower tray and downcomer structure, said downcomer having one wall extending downwardly from said tray toward said lower tray and downcomer structure, at least a portion of said one wall being sloped at an angle to the vertical and comprising a sheet of liquid permeable material being constructed to present a substantially vapor-impervious barrier when wetted with a liquid during operation of the mass transfer column, wherein said downcomer includes other walls joined with said one wall to form a liquid confining structure, at least a portion of said other walls comprising a liquid permeable material being constructed to present a substantially vapor-impervious barrier when wetted with a liquid during operation of the mass transfer column.

* * * * *